United States Patent
Klingauf et al.

(10) Patent No.: US 11,232,033 B2
(45) Date of Patent: Jan. 25, 2022

(54) APPLICATION AWARE SOC MEMORY CACHE PARTITIONING

(71) Applicant: Apple Inc., Cupertino, CA (US)

(72) Inventors: Wolfgang H. Klingauf, San Jose, CA (US); Connie W. Cheung, Sunnyvale, CA (US); Rohit K. Gupta, Santa Clara, CA (US); Rohit Natarajan, Sunnyvale, CA (US); Vanessa Cristina Heppolette, Palo Alto, CA (US); Varaprasad V. Lingutla, Fremont, CA (US); Muditha Kanchana, San Jose, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/530,216

(22) Filed: Aug. 2, 2019

(65) Prior Publication Data
US 2021/0034527 A1 Feb. 4, 2021

(51) Int. Cl.
*G06F 12/0842* (2016.01)
*G06F 12/0895* (2016.01)

(52) U.S. Cl.
CPC ...... *G06F 12/0842* (2013.01); *G06F 12/0895* (2013.01); *G06F 2212/1041* (2013.01)

(58) Field of Classification Search
CPC ............ G06F 12/0842; G06F 12/0895; G06F 2212/1041
See application file for complete search history.

(56) References Cited

U.S. PATENT DOCUMENTS

| | | | |
|---|---|---|---|
| 10,089,239 B2 | 10/2018 | Knies et al. | |
| 10,095,621 B1* | 10/2018 | Birke | G06F 11/301 |
| 2007/0294410 A1 | 12/2007 | Pandya et al. | |
| 2011/0238919 A1 | 9/2011 | Gibson et al. | |
| 2013/0275683 A1* | 10/2013 | Kacevas | G06F 12/1036 711/128 |
| 2015/0088805 A1* | 3/2015 | Kakarla | G06F 16/217 707/600 |

(Continued)

OTHER PUBLICATIONS

International Search Report and Written Opinion in International Application No. PCT/US2020/044464, dated Nov. 26, 2020, 11 pages.

*Primary Examiner* — Michelle T Bechtold
(74) *Attorney, Agent, or Firm* — Kowert Hood Munyon Rankin and Goetzel PC; Rory D. Rankin

(57) ABSTRACT

Systems, apparatuses, and methods for dynamically partitioning a memory cache among a plurality of agents are described. A system includes a plurality of agents, a communication fabric, a memory cache, and a lower-level memory. The partitioning of the memory cache for the active data streams of the agents is dynamically adjusted to reduce memory bandwidth and increase power savings across a wide range of applications. A memory cache driver monitors activations and characteristics of the data streams of the system. When a change is detected, the memory cache driver dynamically updates the memory cache allocation policy and quotas for the agents. The quotas specify how much of the memory cache each agent is allowed to use. The updates are communicated to the memory cache controller to enforce the new policy and enforce the new quotas for the various agents accessing the memory.

20 Claims, 9 Drawing Sheets

(56) References Cited

U.S. PATENT DOCUMENTS

| | | | |
|---|---|---|---|
| 2016/0378628 A1* | 12/2016 | Nguyen | G06F 11/27 714/40 |
| 2018/0137208 A1 | 5/2018 | Ricker et al. | |
| 2019/0042314 A1* | 2/2019 | Verrall | G06F 9/4881 |

* cited by examiner

*Memory Cache Quota Table*
*300*

| Data Flow | DSID | Quota Group | Quota Recommendation | Bandwidth Reduction Score | Running Sum of Quotas |
|---|---|---|---|---|---|
| Video Encoder – Flow A | 12 | 3 | 2.5 MB | 15 | 2.5 MB |
| Camera | 9 | 2 | 1 MB | 13 | 3.5 MB |
| Video Encoder – Flow B | 5 | 3 | 2.5 MB | 9 | 3.5 MB |
| Agent 305 | 1 | 1 | .4 MB | 6.7 | 3.9 MB |
| ⋮ | | | | | |

*FIG. 3*

APPLICATION AWARE SOC MEMORY CACHE PARTITIONING

BACKGROUND

Technical Field

Embodiments described herein relate to the field of integrated circuits and, more particularly, to efficiently utilizing a memory cache.

Description of the Related Art

Lower-level memory in a computing system provides relatively inexpensive and relatively large data storage capacity, especially compared to on-chip caches. However, off-chip dynamic random access memory (DRAM) and hard drives used as lower-level memory have appreciable access times when data access requests are serviced. Therefore, system performance is affected. One approach to improving performance involves using one or more caches in a hierarchical memory subsystem to reduce data access latencies.

While using caches can improve performance, various issues reduce the effectiveness of cache performance. For example, collision misses occur within a set-associative or a direct-mapped cache when too many blocks map to a same set. These misses cause one or more blocks to be discarded within that set. The cache misses cause accesses to lower-level memory to retrieve the requested data in addition to evicting data to create storage for the retrieved data. As a consequence, the average memory latency for a given source in the system may be degraded due to the misses, system performance decreases, and power consumption increases.

A memory cache can help reduce memory power and improve processor performance by reducing the number of accesses to lower-level memory. Reading and writing data to a memory cache consumes less energy than reading and writing data to memory (e.g., DRAM). Hence, increasing the memory cache hit rate can reduce power consumption. The higher the memory cache hit rate for a given application, the lower the overall energy used for the memory accesses generated by the given application.

In view of the above, methods and mechanisms for efficiently utilizing a memory cache are desired.

SUMMARY

Systems and methods for efficiently sharing a memory cache among a plurality of agents are contemplated. In various embodiments, a computing system includes a plurality of agents with at least one processor, a communication fabric, a memory cache, and a lower-level memory. The memory cache acts as a last-level cache for the lower-level memory in a hierarchical memory subsystem. When the processor executes instructions of a software application, the processor generates memory access requests for fetching instructions and application data as well as for generating new result data. The memory access requests are sent to the memory cache and when a cache miss occurs, the memory access request is sent from the memory cache to the lower-level memory. When data is selected for replacement in the memory cache, the data is written back to the lower-level memory.

In various embodiments, a memory cache allocation policy is dynamically adjusted during run-time and agents' memory cache quota allotments are also dynamically adjusted during run-time. The partitioning of the memory cache for the active data streams of the agents is dynamically adjusted to achieve reduced memory bandwidth and increased power savings across a wide range of applications. A memory cache driver monitors activations and characteristics of the data streams of the system. When a change is detected for the activations and/or characteristics, the memory cache driver dynamically updates the memory cache allocation policy and quotas for the agents. The quotas specify how much of the memory cache each agent is allowed to use. The updates are communicated to the memory cache controller to enforce the new policy and quotas for the various agents accessing the memory.

These and other embodiments will be further appreciated upon reference to the following description and drawings.

BRIEF DESCRIPTION OF THE DRAWINGS

The above and further advantages of the methods and mechanisms may be better understood by referring to the following description in conjunction with the accompanying drawings, in which:

FIG. 3 illustrates one embodiment of a memory cache quota table.

Figure 1:
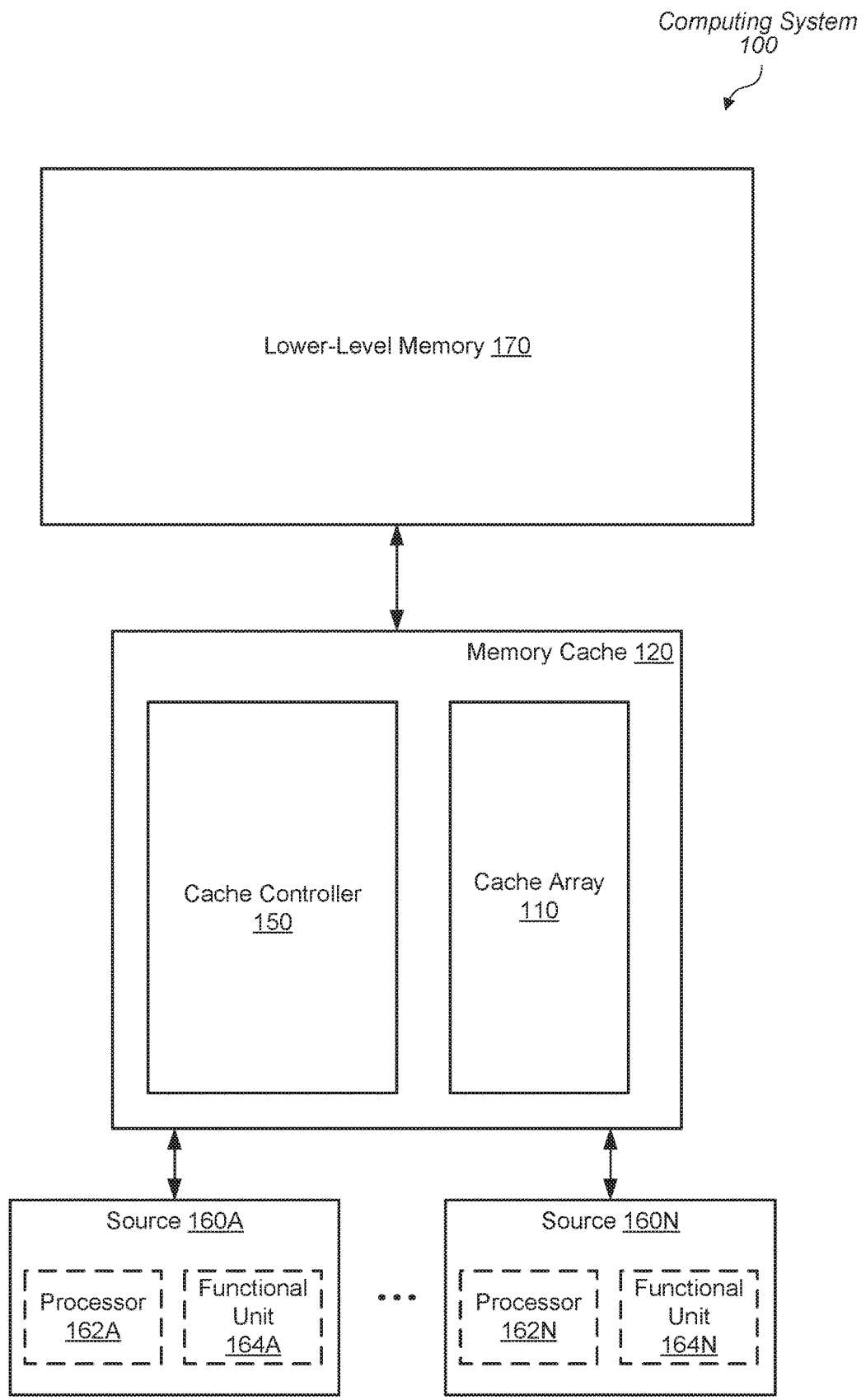
FIG. 1 is a block diagram of one embodiment of a computing system.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) for that unit/circuit/component.

DETAILED DESCRIPTION OF EMBODIMENTS

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

Referring to FIG. 1, a block diagram illustrating one embodiment of a computing system 100 is shown. In the illustrated embodiment, any number of sources 160A-N are connected to a memory cache 120 which stores one or more of instructions of a software application, application data fetched along with the instructions, generated data, and generated result data. The memory cache 120 is connected to a lower-level memory 170 which stores similar types of data as the memory cache 120. In various embodiments, the memory cache 120 and the lower-level memory 170 are part of a hierarchical memory subsystem. Although not shown, in some embodiments, the sources 160A-N include one more levels of caches. It is noted that the terms "source" and "agent" may be used interchangeably herein.

The cache controller 150 and the cache array 110 of memory cache 120 use one of a variety of methods of addressing for locating data such as a direct mapped method, a set-associative method or a fully-associative method. When a set-associative cache organization is used, a given cache set is chosen by the block index of an address of a memory access request. A line tag in each of the cache entries of cache array 110 is used to determine which of the multiple cache lines are being accessed within the chosen one of the cache sets. In addition, an offset in the address is used to indicate a specific byte or word within the targeted cache line.

The line data of each of the cache entries of cache array 110 stores one or more cache lines. As used herein, a "cache line" is a set of bytes stored in contiguous memory locations, which are treated as a unit for coherency purposes. As used herein, the terms "cache block", "block", "cache line", and "line" are interchangeable. In some embodiments, a cache line is the unit of allocation and deallocation in memory cache 120. The number of bytes in a cache line and also a cache entry is varied according to design choice, and is of any size. As an example, 32 byte and 64 byte cache lines are often used.

As used herein, the term "allocate" refers to storing a cache fill line fetched from a next lower level of the hierarchy into one of the cache entries of cache array 110 subsequent to a cache miss to the cache array 110. If there are no available ways (i.e., storage locations) within the corresponding set of a set-associative cache organization, then a cache replacement policy, such as a Least Recently Used (LRU) algorithm, determines which way within the set is to have its data evicted and replaced by the cache fill line data. The evicted cache line is written back to the lower-level memory 170. In various embodiments, a line state in each of the cache entries of cache array 110 stores one or more of a valid bit, a thread identifier (ID), a node ownership ID, a clean/dirty state, LRU eviction information, an indication of the data set, an indication designating a cache coherency state such as modified, exclusive, owned, shared, and invalid, and so forth.

In various embodiments, the sources 160A-N includes one or more of a variety of types of processors and functional units used for processing instructions of software applications and corresponding data. For example, in an embodiment, the processor 162A within the source 160A is one of a variety of processors such as a general-purpose central processing units (CPU), or a highly parallel data processing unit using a single instruction multiple data (SIMD) microarchitecture such as a graphics processing unit (GPU), a digital signal processor (DSP) or a field programmable gate array (FPGA). Although a single processor 162A is shown, in various embodiments, the source 160A includes multiple processors. In one embodiment, the source 160A uses a combination of processor types in a heterogeneous architecture. Each of the processors uses one or more processor cores and supports the processing of one or more threads. Processor 162N of source 160N is similarly representative of any number and type of processors.

In an embodiment, the functional unit 164A within the source 160A and the functional unit 164N of source 160N are any of multiple types of integrated circuits (functional units) on a single semiconductor die, each integrated circuit providing a separate functionality. Examples of the functional units are a camera functional unit, a video encoder, a video decoder, a media controller, and so on. In some embodiments, the processor 162A and the functional unit 164A are individual integrated circuits (ICs) on an integrated die, such as a system-on-a-chip (SoC). In other embodiments, they are individual dies within a package, such as a multi-chip module (MCM). In yet other embodiments, they are individual dies or chips on a printed circuit board. In various embodiments, each of the processor 162A and the functional unit 164A is capable of accessing the shared memory cache 120.

In various embodiments, the lower-level memory 170 is off-chip or external memory. Examples of the lower-level memory 170 are dynamic random-access memory (DRAM), synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. In some embodiments, the lower-level memory 170 uses one or more memory modules to which the memory devices are mounted, such as single inline memory modules (SIMMs), dual inline memory modules (DIMMs), etc. In other embodiments, the lower-level memory 170 uses one or more memory devices that are mounted on a system on a chip (SoC) in a chip-on-chip or package-on-package implementation utilizing three dimensional integrated circuits (3D ICs).

In various embodiments, the latencies and the power consumption for accesses of the lower-level memory 170 are at least an order of magnitude greater than the latencies and the power consumption for accesses of the memory cache 120. Therefore, reducing unnecessary accesses of the lower-level memory 170 decreases memory traffic and reduces power consumption. To reduce unnecessary accesses, system 100 partitions memory cache 120 among the sources 160A-N to implement an efficient sharing scheme. To this end, system 100 dynamically determines memory cache quotas for sources 160A-N rather than having a statically-assigned memory cache quota for each source 160A-N. This allows for dynamic partitioning of memory cache 120 which can adapt to the changing behavior of sources 160A-N.

Therefore, memory traffic is reduced and power consumption is decreased, resulting in an improvement in system performance.

In one embodiment, each memory request generated by a source 160A-N carries a marking or flag throughout the computing system 100 which identifies the agent and/or data flow of the memory request. In some embodiments, the indication or flag is a particular data set identifier (DSID). In some cases, multiple DSIDs are mapped to a single quota group, with the single quota group sharing an amount of memory cache 120 that is allocated for this quota group. In one embodiment, DSIDs for data flows that logically share a same memory region are mapped to a single quota group. A single quota group ID will then be used for these multiple DSIDs. In other cases, a single quota group is reserved for a single DSID. As used herein, the term "data flow" is defined as the memory requests that are generated by a single process during one execution of this process. In some cases, a source 160 will have a single data flow, and the single data flow will be identified by a single DSID. In other cases, a source 160 will have multiple separate data flows, and each data flow will have a different DSID.

In one embodiment, each data flow is assigned a priority which determines which data flow gets to allocate in memory cache 120 when multiple sources 160A-N are competing for space in the memory cache. In one embodiment, the priority is indicated based on the location of the row in a memory cache quota table, with the highest priority data flow located at the top of the table and with the lowest priority data flow located at the bottom of the table. The other rows in between are sorted according to the priority of the data flow. In another embodiment, the priority is indicated by a separate field in each row of the memory cache quota table (e.g., memory cache quota table 300 of FIG. 3). Other ways of indicating the priority are possible and are contemplated.

In one embodiment, the priority of a given data flow is determined based on the memory bandwidth reduction that is achieved for a given unit of capacity of the memory cache 120 for the given data flow. Accordingly, data flows that achieve a higher memory bandwidth reduction to lower-level memory 170 will be prioritized for allocating into memory cache 120. The memory bandwidth reduction may be determined ahead of time based on simulations or other tests, or the memory bandwidth reduction may be determined in real-time based on observed memory request traffic.

Figure 2:
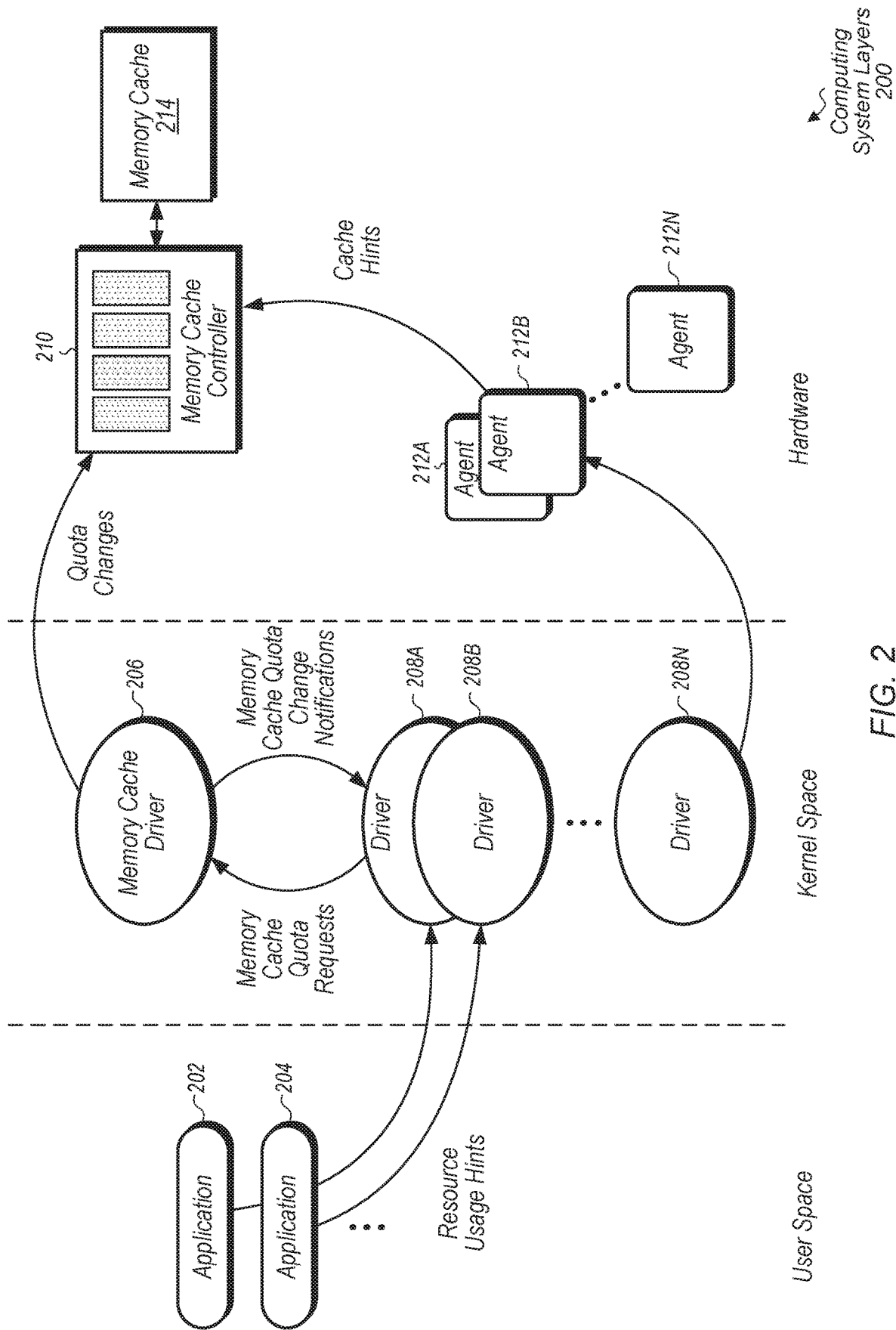
FIG. 2 illustrates one embodiment of computer system layering model.

Turning now to FIG. 2, one embodiment of a computing system layering model 200 is shown. As shown, model 200 uses a collection of user space components, kernel space components and hardware. A layered driver model, such as model 200, is one manner to process the software applications 202 and 204, which are representative of any number and type of software applications. In this model, each driver 208A-N is responsible for processing a part of a request. Such a layered driver model allows functionality to be dynamically added to a driver stack. It also allows each driver 208A-N to specialize in a particular type of function and decouples it from having to know about other drivers.

In various embodiments, each software application 202 and 204 is a computer program written by a developer in one of a variety of high level programming languages such as C, C++, FORTRAN, and Java and so on. In various embodiments, each software application 202 and 204 begins being processed on a general-purpose central processing unit (CPU) and later translated commands and corresponding data sets are sent to a co-processor or other type of processing unit. In one embodiment, a selected library translates function calls in the software applications 202 and 204 to commands particular to a piece of hardware, such as agents 212A-N. Agents 212A-N are representative of any type of hardware component (e.g., GPU, video encoder, camera). In various embodiments, requests corresponding to translated commands are sent from a driver 208A-N to a corresponding agent 212A-N. In one embodiment, the translated command carries the data set ID (DSID) of the request. Agents 212A-N will then send the DSIDs along with their requests. This allows all requests that belong to a data flow to be identified by their use of the same DSID.

In various embodiments, the memory cache capacity that is available to a data flow or a group of data flows will be limited to a programmable quota by memory cache controller 210. In some embodiments, each data flow or group of data flows is mapped to a separate quota group, and each separate quota group has a programmable quota which limits the amount of cache capacity that can be used by the data flow(s) of this quota group. In one embodiment, the programmable quota for a given data flow or group of data flows is communicated to memory cache controller 210 by memory cache driver 206. Using the DSIDs in combination with the programmable quota groups allows the memory cache 214 to be partitioned such that each data flow or group of data flows uses only a portion of memory cache 214. In this manner, memory cache 214 behaves as if it is a number of private caches with configurable sizes, with one private cache for each data flow or group of data flows.

In one embodiment, applications 202 and 204 send resource usage hints to corresponding drivers 208A-N. Based on at least these received resource usage hints, drivers 208A-N send memory cache quota requests to memory cache driver 206. Drivers 208A-N also send information to memory cache driver 206 about the active data flows of their corresponding hardware blocks. Based on these inputs and other information, memory cache driver 206 is responsible for dynamically partitioning memory cache 214 among the agents 212A-N. In one embodiment, memory cache driver 206 attempts to dynamically partition memory cache 214 among agents 212A-N such that the memory bandwidth to lower-level memory (not shown) is minimized. To achieve this goal of minimizing memory bandwidth, memory cache driver 206 generates scores for the different agents 212A-N based on how much their use of memory cache 214 reduces their corresponding memory traffic to the lower-level memory. In various embodiments, the memory cache 214 is the last-level cache before accesses are sent to lower-level memory such as DRAM.

The memory cache controller 210 controls accesses to the cache array within the memory cache 214. In various embodiments, the cache array uses a separate tag array and a data array. In other embodiments, tags and other state and metadata are stored in the same array with the corresponding data. The memory cache controller 210 in the memory cache 214 receives cache hints from the hardware agents 212A-N on whether data should be allocated in the memory cache 214. These cache hints affect the fine-grained cache allocation policy implemented by the memory cache controller 210. In various embodiments, resource usage hints arrive at the memory cache controller 210 from the software application 202 or 204 sent via the corresponding driver 208A-N and agent 212A-N.

In one embodiment, the memory cache controller 210 also implements a coarse-grained cache allocation policy that is based on the quotas assigned to the data flows and/or quota groups. For example, in one embodiment, the memory cache controller 210 determines how much of the memory cache 214 to allocate to each data flow and/or quota group based on the quotas assigned to the data flows and/or quota groups by memory cache driver 206. During run-time, the memory cache controller 210 receives updates to the quota assignments for the various quota groups from memory cache driver 206. This allows the partitioning of the memory cache to dynamically adapt to changing conditions of applications 202 and 204 as well as to the data characteristics and memory access patterns of hardware agents 212A-N. Additionally, in one embodiment, the LRU replacement policy in memory cache 214 involves tracking the LRU status separately per quota group. In other embodiments, replacement policies other than an LRU replacement policy may be used. Accordingly, the memory cache 214 appears like a number of smaller private caches to hardware agents 212A-N, with each partition being dedicated to the set of data flows whose data set IDs (DSIDs) share a quota group.

In one embodiment, memory cache driver 206 maintains a table to store received and/or calculated information for data flows which are accessing memory cache 214. One example of a table maintained by a memory cache driver is shown in FIG. 3 and described further below. In one embodiment, the different data flows are organized according to quota groups, with one or more data flows mapped to a single quota group. Each quota group is assigned a quota specifying how much of memory cache 214 the quota group is allowed to use. In some cases, the total quota assigned to all of the quota groups is greater than the capacity of memory cache 214. In these cases, memory cache controller 210 will determine which quota groups to allocate in the memory cache 214 based on the priorities of the individual data flows that make up the quota groups.

In one embodiment, after memory cache driver 206 calculates and assigns quotas to the various quota groups, memory cache driver 206 will monitor operating conditions to determine if an update to the quotas is desired. Such an update may be desired if the update is predicted to result in a reduction in the overall memory traffic to the lower-level memory. In addition to monitoring operating conditions, memory cache driver 206 will also receive memory cache quota requests from drivers 208A-N. When memory cache driver 206 determines that changes to the quotas should be made, memory cache driver 206 communicates these changes to driver 208A-N and to memory cache controller 210. Memory cache controller 210 is responsible for enforcing the changes to the quotas corresponding to agents 212A-N which are attempting to allocate in memory cache 214.

In one embodiment, each hardware agent 212A-N assigns a DSID to the memory requests of each of their data flows. In this embodiment, the drivers 208A-N for these hardware agents 212A-N create logical groups of the data flows that share the same memory region. The same quota group is then used for each logical group of data flows. Each quota group shares a single quota group ID, and memory cache driver 206 assigns a quota to each quota group ID. Memory cache controller 210 enforces the usage of memory cache 214 for each quota group to ensure that the quota group only uses up to its assigned quota. Additionally, in one embodiment, each driver 208A-N generates an estimate of a bandwidth reduction score for each data flow. In one embodiment, the bandwidth reduction score is calculated based on an estimate of the expected memory bandwidth saved per some unit of memory cache usage (e.g., a number of gigabytes per second that are saved per megabyte used). The drivers 208A-N convey the estimated bandwidth reduction scores to memory cache driver 206. In some cases, the drivers 208A-N also convey requested quota sizes to memory cache driver 206. Memory cache driver 206 updates the table based on these estimated bandwidth reduction scores and requested quota sizes. During runtime, if these values and/or other values are updated, memory cache driver 206 updates the quotas that are assigned to the quota groups. Any updates to the assigned quotas are then communicated to memory cache controller 210 for enforcement.

Referring now to FIG. 3, one embodiment of a memory cache quota table 300 for managing and calculating quotas is shown. Table 300 includes any number of entries for different agents in the system. The number of entries may vary from embodiment to embodiment, and the number of entries may vary as different applications are initiated or terminated, causing the number of agents that are active in the system to change. In one embodiment, the fields stored in each entry of table 300 include a data flow field 310, a data set ID (DSID) field 320, a quota group field 330, a quota recommendation field 340, a bandwidth reduction score 350, and a running sum of quotas field 360. In other embodiments, table 300 may include other fields and/or table 300 may be organized in other suitable manners.

In one embodiment, table 300 is sorted according to the bandwidth reduction score, with rows with higher bandwidth reduction scores stored at the top of table 300. In one embodiment, the bandwidth reduction score is calculated based on the memory bandwidth reduction that is achieved for a given unit of capacity of the memory cache. Depending on the embodiment, the bandwidth reduction score is pre-computed based on previously observed use cases or the bandwidth reduction score is tracked and calculated in real-time based on observed memory access traffic. In one embodiment, the bandwidth reduction score is calculated as the memory bandwidth saved divided by the memory cache footprint of the quota group.

In one embodiment, the memory cache driver (e.g., memory cache driver 206 of FIG. 2) programs the quota recommendations 340 for the quota groups so as to achieve the highest possible memory bandwidth savings for the system as a whole. During runtime, the memory cache driver receives updates and/or recalculates the fields in the entries in table 300 and changes the quota recommendations 340 as conditions change. By continuously updating table 300, the memory cache driver ensures that only the highest ranked data flows are allocated into the memory cache. In one embodiment, a hysteresis function may be used to avoid oscillation. The memory cache driver partitions the memory cache to make it behave like a number of private caches, with a separate private cache for each quota group. This helps to prevent thrashing between the quota groups.

In one embodiment, the memory cache driver communicates priorities to the memory cache controller for the active data flows. The priorities are based on the location of the corresponding entries in the table 300, with entries at the top of table 300 having higher priorities than entries at the bottom of table 300. This approach allows lower priority data flows to be allocated into the memory cache when space is available. For example, lower priority data flows can opportunistically make use of the memory cache during time periods when memory cache capacity is not being used by higher priority data flows. The memory cache priority scheme allows the higher priority data flows to replace lower priority data flows from the memory cache when the higher priority data flows are reactivated. This ensures that the higher priority data flows are able to get their assigned memory cache quota capacity whenever they need it by evicting the data of the lower priority data flows.

As shown in table 300, there are rows for agents such as a video encoder flow A, camera, video encoder flow B, and agent 505. Agent 505 is representative of any type of agent (e.g., graphics engine, memory management unit, processor, display controller, media controller) in the system. It should be understood that the example of the video encoder flow A having the highest bandwidth reduction score is shown for illustrative purposes only. In other embodiments, any of various other data flows may have the highest bandwidth reduction score.

In one embodiment, the memory cache driver communicates data from table 300 to the memory cache controller to help in determining the memory cache allocation policy and quota assignment policy. Since the memory cache driver continuously updates table 300 as operating conditions change, the quotas assigned to the different data flows may change over time as conditions vary. As some data flows are deactivated and new data flows are activated, the rows in table 300 may move up or down and the assigned quotas will be adjusted accordingly. In one embodiment, the total quota assigned to all of the quota groups, as indicated by the running sum of quotas column 360 in table 300, is allowed to be greater than the total capacity of the memory cache. When different data flows are competing for cache space, the data flows with higher priority will be given preference for allocating their data in the memory cache.

In one embodiment, the quota recommendations shown in table 300 are derived from analyzing each of the data flows in isolation. In one embodiment, the data flows are analyzed using simulation models. For each data flow, statistics (and, e.g., a corresponding curve) may be generated which shows the memory bandwidth savings that can be achieved with a given memory cache size. The memory bandwidth savings is based on the temporal and spatial locality of the data flows. In one embodiment, in an offline analysis, the knee in the curve is located and used to come up with a balanced quota recommendation for each of the data flows. If the quota is too small, this would diminish the hit rate while if the quota is too large, this would result in few additional hits while wasting cache capacity. Accordingly, in one embodiment, the quota for a given data flow is calculated to be balanced somewhere in between these high and low values.

In one embodiment, active data flows are combined into quota groups such that groups of data flows that logically share the same memory region are mapped to the same quota group. If multiple data set IDs are mapped onto the same quota group, then the data flows of these multiple data set IDs share the quota allocated to the quota group. When the quota allocated to a quota group is set to 0, this instructs the memory cache controller that requests with a data set ID mapped into this quota group are not allowed to allocate in the memory cache and should be forwarded to the memory instead. A quota value greater than 0 instructs the memory cache controller that requests with a data set ID in this quota group are allowed to use up to this amount of memory cache capacity. While the quota values shown in table 300 are shown as some number of megabytes (MBs), in other embodiments, the quota values may be expressed in other units (e.g., numbers of cache lines).

Figure 4:
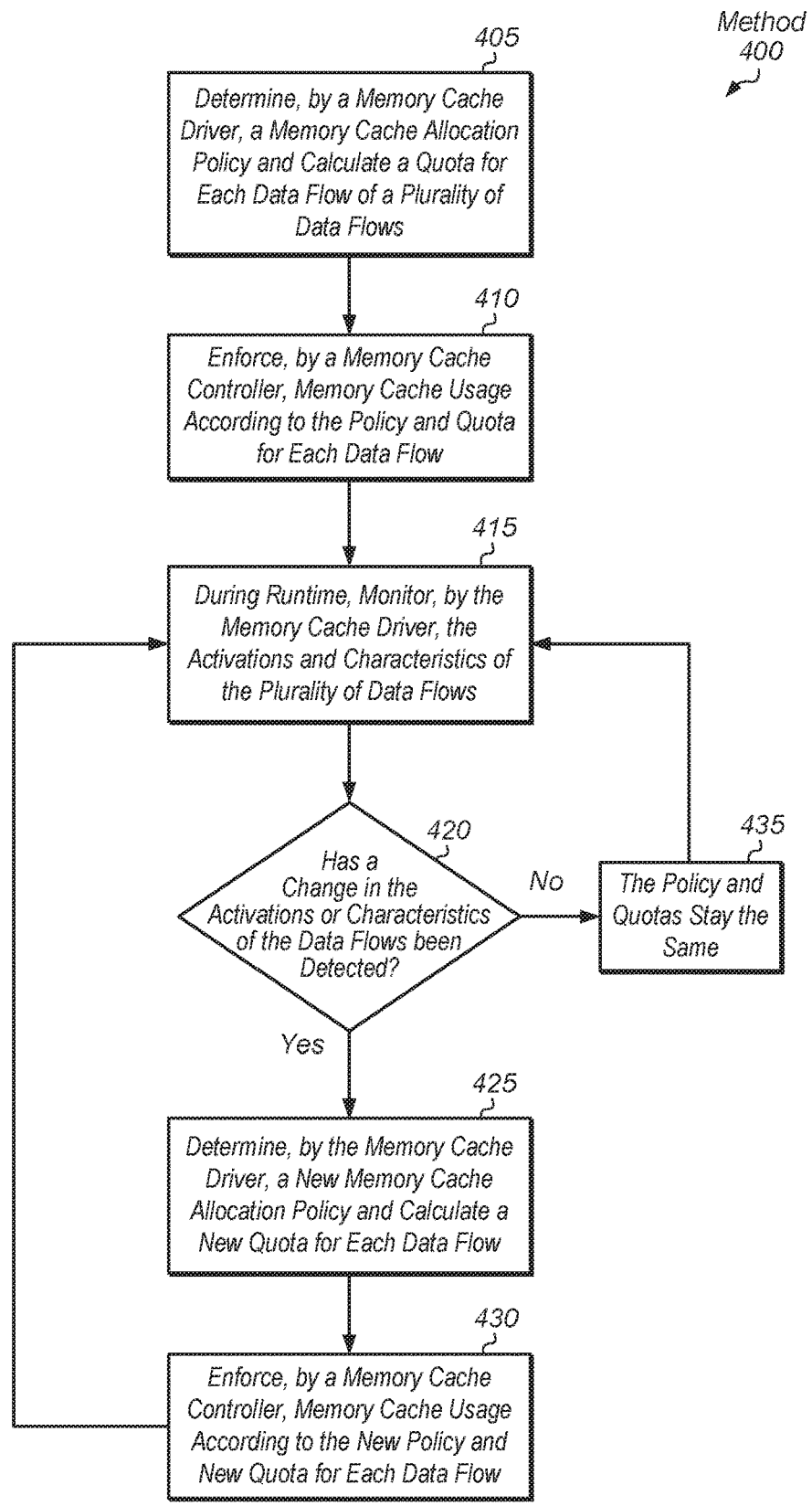
FIG. 4 is a flow diagram of one embodiment of a method for dynamically partitioning a memory cache.

Referring now to FIG. 4, a generalized flow diagram of one embodiment of a method 400 for dynamically partitioning a memory cache is shown. For purposes of discussion, the steps in this embodiment (as well as for FIGS. 5, 6, and 7) are shown in sequential order. However, in other embodiments some steps may occur in a different order than shown, some steps may be performed concurrently, some steps may be combined with other steps, and some steps may be absent.

A memory cache driver determines a memory cache allocation policy and calculates a quota for each data flow of a plurality of data flows (block 405). In one embodiment, each data flow corresponds to a separate agent. In some cases, multiple data flows are combined together into a single quota group, with the single quota group sharing a quota among the multiple data flows. A memory cache controller enforces memory cache usage according to the policy and quota for each data flow (block 410). For example, each data flow is limited to using the quota that is allocated for the data flow.

During runtime, the memory cache driver monitors the activations and characteristics of the plurality of data flows (block 415). For example, in various embodiments, the memory cache driver monitors one or more of the cache usage, the memory bandwidth saved per unit of cache used, the status of agents, number of active agents, cache thrashing rates, device power consumption, battery status, and/or other operating conditions. In one embodiment, the memory cache driver receives a list of all of the agents currently active in the system and the data set IDs and the quota groups of these agents. Additionally, in this embodiment, the memory cache driver receives the memory cache quota that is requested by the agent drivers for each of the quota groups. Still further, in this embodiment, the memory cache driver receives the expected memory cache bandwidth savings (i.e., the bandwidth reduction score) for each of the quota groups. In one embodiment, based on this information, the memory cache driver generates a table (e.g., table 300 of FIG. 3) of active data flows. The memory cache driver continuously updates the table at system runtime when data flows are deactivated and when new data flows are activated. In one embodiment, the table is sorted by cache usage efficiency (i.e., the bandwidth reduction score).

If a change in the activations and characteristics of the plurality of data flows is detected (conditional block 420, "yes" leg), then the memory cache driver determines a new memory cache allocation policy and calculates a new quota for each data flow (block 425). This dynamic adjustment of the memory cache allocation policy and quota for the data flows allows the memory cache driver to adjust to changing operating conditions. Next, the memory cache controller enforces memory cache usage according to the new policy and new quota for each data flow (block 430). After block 430, method 400 returns to block 415. If a change in the activations and characteristics of the plurality of data flows is not detected (conditional block 420, "no" leg), then the policy and quotas stay the same (block 435), and method 400 returns to block 415.

Figure 5:
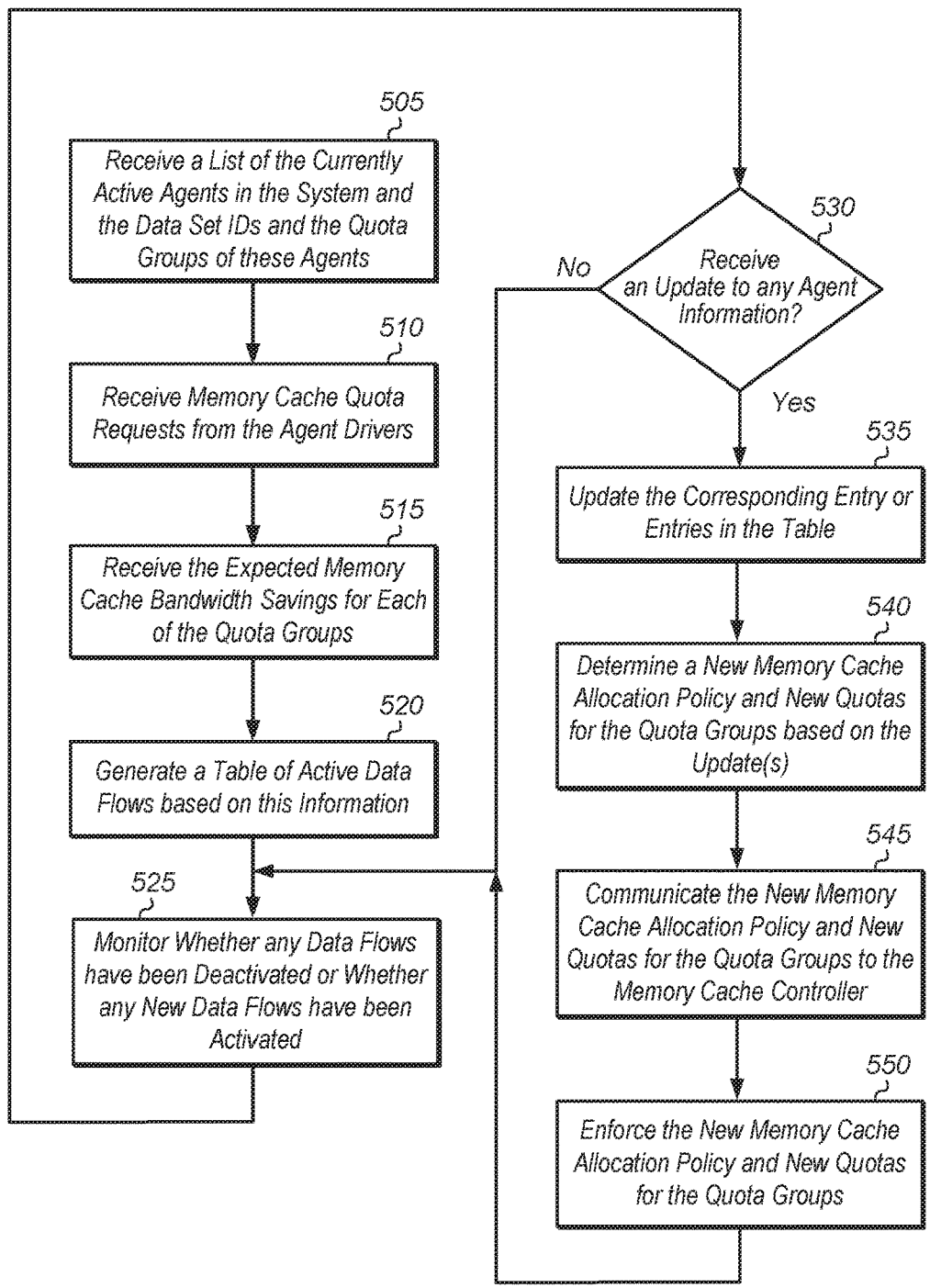
FIG. 5 is a flow diagram of one embodiment of a method for monitoring the activations, characteristics, and memory cache usage of agents in a computing system.

Referring now to FIG. 5, one embodiment of a method 500 for monitoring the activations, characteristics, and memory cache usage of agents in a computing system is shown. A memory cache driver receives a list of the currently active agents in the system and the data set IDs and the quota groups of these agents (block 505). Additionally, in this embodiment, the memory cache driver receives the memory cache quota requests from the agent drivers (block 510). Still further, in this embodiment, the memory cache driver receives the expected memory cache bandwidth savings (i.e., the bandwidth reduction score) for each of the quota groups (block 515). Based on this information, the memory cache driver generates a table of active data flows (block 520). In one embodiment, the table is sorted by cache usage efficiency (i.e., the bandwidth reduction score). The memory cache driver monitors whether any data flows have been deactivated or whether any new data flows have been activated (block 525).

During runtime, if the memory cache driver receives an update regarding the agent information or data flows (conditional block 530, "yes" leg), then the memory cache driver updates the corresponding entry or entries in the table (block 535). If the memory cache driver does not receive an update to any of the agent information (conditional block 530, "no" leg), then method 500 returns to block 525. After block 535, the memory cache driver determines a new memory cache allocation policy and new quotas for quota groups based on the update(s) (block 540). Next, the memory cache driver communicates the new memory cache allocation policy and the new quotas for quota groups to the memory cache controller (block 545). Then, the memory cache controller enforces the new memory cache allocation policy and new quotas for the quota groups (block 550). After block 550, method 500 returns to 525

Figure 6:
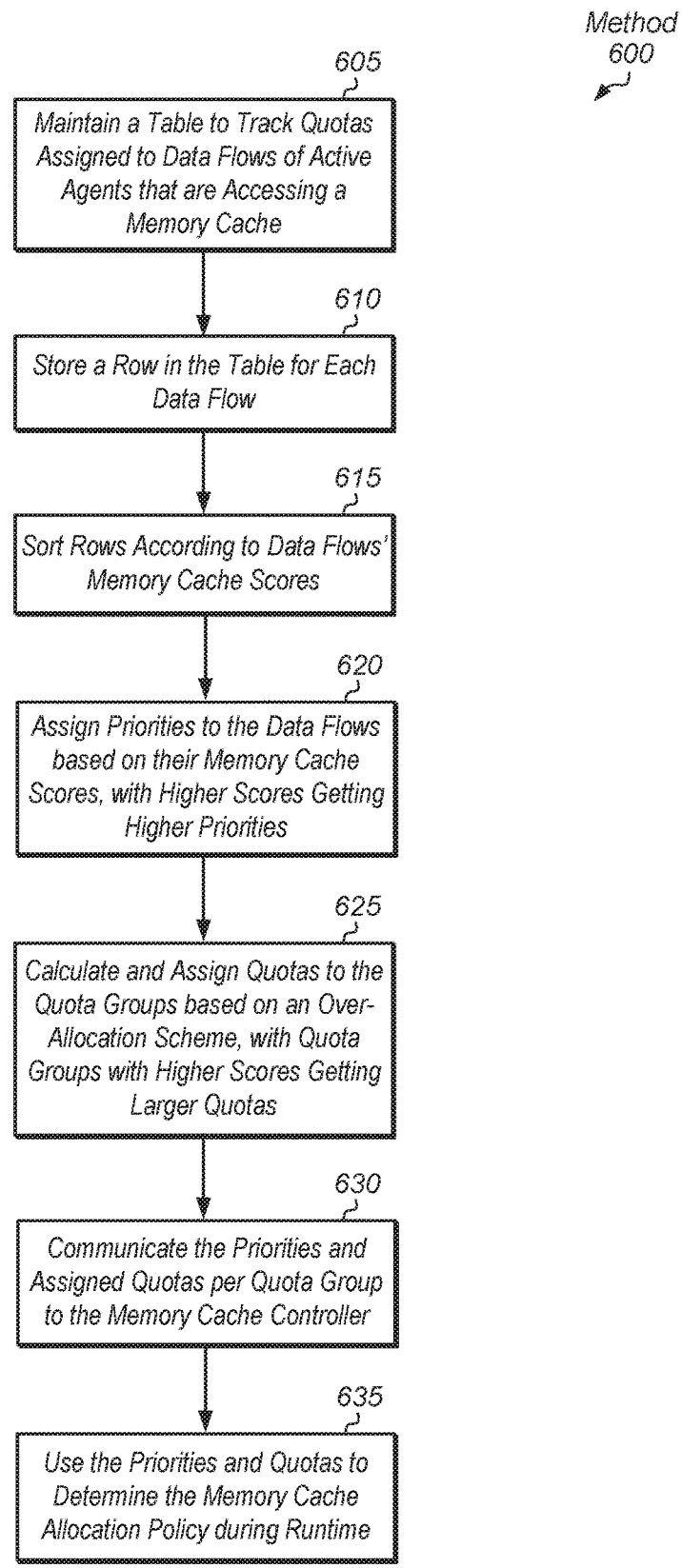
FIG. 6 is a flow diagram of one embodiment of a method for determining memory cache quotas for a plurality of quota groups.

Turning now to FIG. 6, one embodiment of a method 600 for determining memory cache quotas for a plurality of quota groups is shown. A memory cache driver maintains a table to track quotas assigned to data flows of active agents that are accessing a memory cache (block 605). The memory cache driver stores a row in the table for each data flow (block 610). The memory cache driver sorts rows according to data flows' bandwidth reduction scores (block 615). In one embodiment, the bandwidth reduction score is calculated based on the reduction of memory bandwidth that is achieved per unit of memory cache capacity used by the data flow. Depending on the embodiment, the memory bandwidth reduction is the expected reduction (i.e., predicted) per unit of memory cache capacity, or the memory bandwidth reduction is the observed reduction per unit of memory cache capacity.

Next, the memory cache driver assigns priorities to the data flows based on their bandwidth reduction scores, with higher scores getting higher priorities (block 620). Also, the memory cache driver calculates and assigns quotas to the quota groups based on an over-allocation scheme, with quota groups with higher scores getting larger quotas (block 625). In one embodiment, data flows that share the same memory region are grouped together into a single quota group. The over-allocation scheme refers to assigning quotas such that the total quota assigned to all of the quota groups is greater than the capacity of the memory cache. When multiple quota groups are active and trying to use a higher capacity than is available in the memory cache, the priorities will determine which quota groups get to allocate and which quota groups will not be allowed to allocate. Then, the memory cache driver communicates the priorities and assigned quotas per quota group to the memory cache controller (block 630). Next, the memory cache controller uses the quotas and priorities to determine the memory cache allocation policy (i.e., which agents get to allocate into the memory cache) during runtime (block 635). One example of the memory cache controller implementing a memory cache allocation policy is described in further detail in the discussion of method 700 (of FIG. 7). After block 635, method 600 ends.

Figure 7:
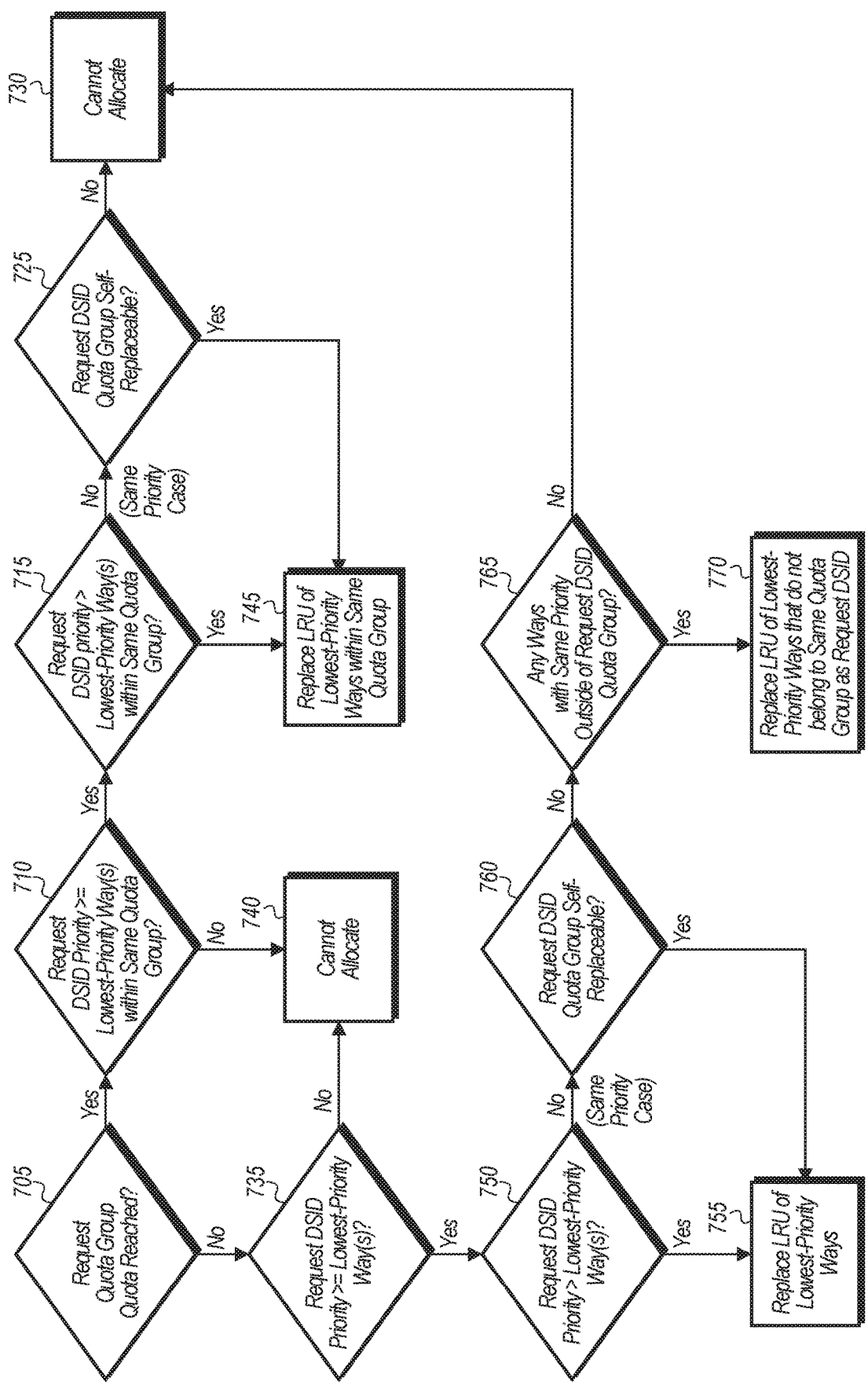
FIG. 7 is a flow diagram of one embodiment of a method for using priority to determine which data set IDs to allocate in the memory cache.

Referring now to FIG. 7, one embodiment of a method 700 for using priority to determine which data set IDs (DSIDs) to allocate in the memory cache is shown. It is assumed that a request to allocate in the memory cache has been received by the memory cache controller prior to the start of method 700. The memory cache controller determines if the quota for the quota group that corresponds to the request has already been reached (conditional block 705). If the allocated quota has already been reached for the quota group of the request (conditional block 705, "yes" leg), then the memory cache controller determines if the request's DSID priority is greater than or equal to the lowest-priority way(s) within the same quota group (conditional block 710). It is noted that the request's DSID priority refers to the priority of the data flow (as identified by a DSID) to which the request corresponds. Also, the lowest-priority way(s) refers to the priority of the data flow whose data is stored in these way(s). If the request quota group quota for the quota group of the request has not been reached (conditional block 705, "no" leg), then the memory cache controller determines if the request's DSID priority is greater than or equal to the lowest-priority way(s) in the memory cache (conditional block 735).

If the request's DSID priority is greater than or equal to the lowest-priority way(s) within the same quota group (conditional block 710, "yes" leg), then the memory cache controller determines if the request's DSID priority is greater than the lowest-priority way(s) within the same quota group (conditional block 715). If the request's DSID priority is less than the lowest-priority way(s) within the same quota group (conditional block 710, "no" leg), then the memory cache controller cannot allocate the data of the request in the memory cache (block 740). After block 740, method 700 ends.

If the request's DSID priority is greater than the lowest-priority way(s) within the same quota group (conditional block 715, "yes" leg), then the memory cache controller replaces the least recently used (LRU) way of the lowest-priority ways within the same quota group (block 745). After block 745, method 700 ends. If the request's DSID priority is the same priority as the lowest-priority way(s) within the same quota group (conditional block 715, "no" leg), then the memory cache controller determines if the request's DSID quota group is self-replaceable (conditional block 725). If the request's DSID quota group is self-replaceable (conditional block 725, "yes" leg), then the memory cache controller replaces the least recently used (LRU) way of the lowest-priority ways within the same quota group (block 745). If the request's DSID quota group is not self-replaceable (conditional block 725, "no" leg), then the memory cache controller does not allocate the data of the request in the memory cache (block 730). After block 730, method 700 ends. It is noted that in one embodiment, a request can replace an existing line whose DSID has a lower priority than the request's DSID. If their priority levels are the same, replacement is possible if the request DSID belongs to a different quota group than the existing line's DSID. However, if their priority levels are the same, and they belong to the same quota group, then in one embodiment, replacement is only possible if that quota group is self-replaceable.

If the request's DSID priority is greater than or equal to the lowest-priority way(s) in the memory cache (conditional block 735, "yes" leg), then the memory cache controller determines if the request's DSID priority is greater than the priority of the lowest priority way(s) (conditional block 750). If the request DSID priority is less than the lowest-priority way(s) in the memory cache (conditional block 735, "no" leg), then the memory cache controller does not allocate the data of the request in the memory cache (block 740). After block 740, method 700 ends.

If the request's DSID priority is greater than the priority of the lowest priority way(s) (conditional block 750, "yes" leg), then the memory cache controller replaces the LRU way of the lowest-priority way(s) (block 755). After block 755, method 700 ends. If the request's DSID priority is the same priority as the lowest priority way(s) (conditional block 750, "no" leg), then the memory cache controller determines if the request's DSID quota group quota is self-replaceable (conditional block 760). If the request's DSID quota group is self-replaceable (conditional block 760, "yes" leg), then the memory cache controller replaces the LRU of the lowest-priority way(s) (block 755). If the request's DSID quota group is not self-replaceable (conditional block 760, "no" leg), then the memory cache controller determines if there are any ways with the same priority outside of the request's DSID quota group (conditional block 765).

If there are any ways with the same priority outside of the request DSID quota group (conditional block 765, "yes" leg), then the memory cache controller replaces the LRU way of the lowest-priority ways that do not belong to the same quota group as the request DSID (block 770). In another embodiment, a replacement policy other than an LRU replacement policy may be used. After block 770, method 700 ends. If there are no ways with the same priority outside of the request DSID quota group (conditional block 765, "no" leg), then the memory cache controller does not allocate the data of the request in the memory cache (block 730). After block 730, method 700 ends.

Figure 8:
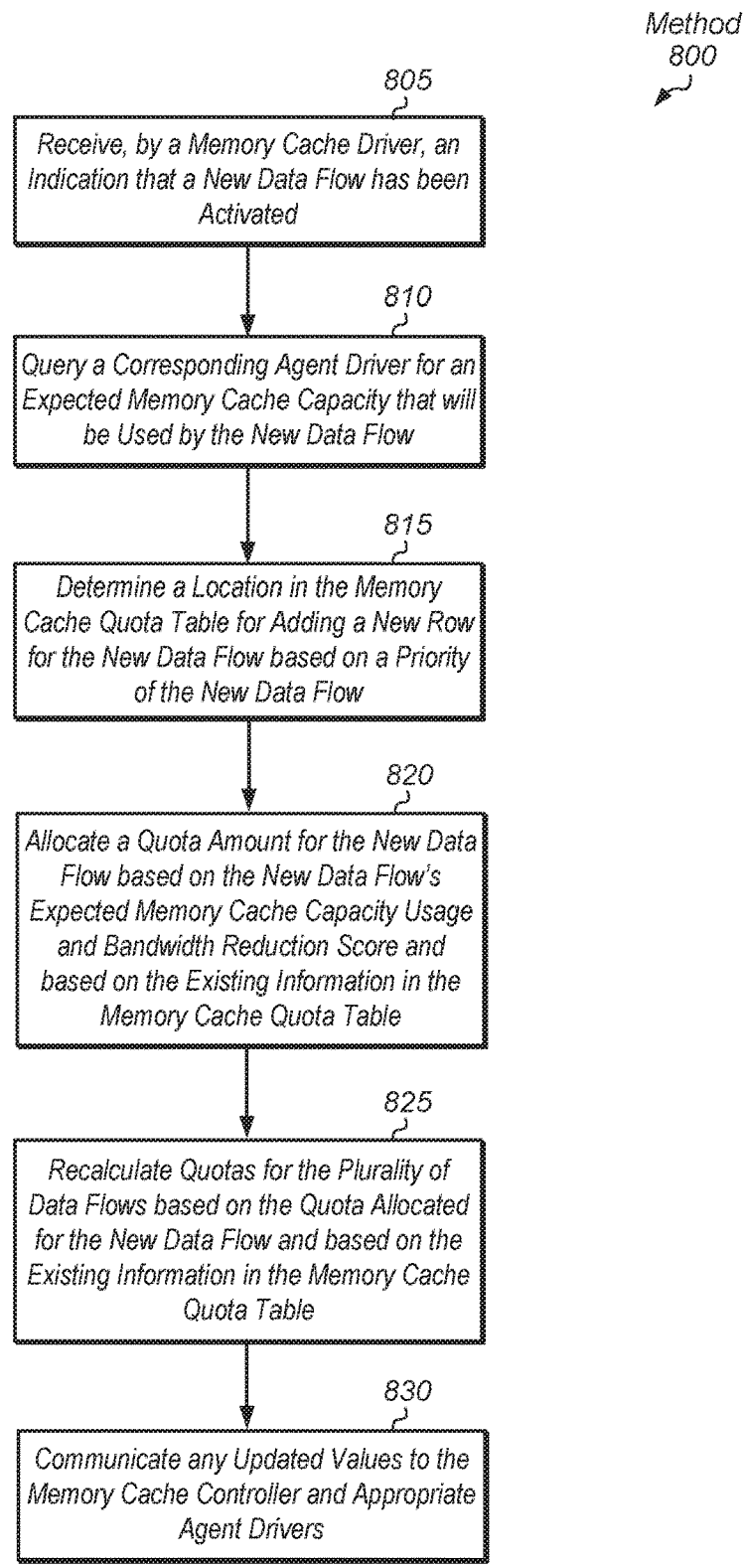
FIG. 8 is a flow diagram of one embodiment of a method for dynamically updating a memory cache quota table.

Turning now to FIG. 8, one embodiment of a method 800 for dynamically updating a memory cache quota table is shown. A memory cache driver receives an indication that a new data flow has been activated (block 805). In response to receiving the indication, the memory cache driver queries a corresponding agent driver for an expected memory cache capacity that will be used by the new data flow (block 810). For example, if a new data flow for a camera is activated, the memory cache driver will query the camera driver for its corresponding agent driver for an expected memory cache capacity usage. The memory cache driver may also query the corresponding agent driver for additional information (e.g., bandwidth reduction score) associated with the new data flow.

Next, the memory cache driver determines a location in the memory cache quota table (e.g., memory cache quota table 300 of FIG. 3) for adding a new row for the new data flow based on a priority of the new data flow (block 815). Then, the memory cache driver allocates a quota amount for the new data flow based on the new data flow's expected memory cache capacity usage and bandwidth reduction score and based on the existing information in the memory cache quota table (block 820). Next, the driver recalculates quotas for the plurality of data flows based on the quota allocated for the new data flow and existing information in the memory cache quota table (block 825). Next, the driver communicates any updated values to the memory cache controller and appropriate agent drivers (block 830). After block 830, method 800 ends.

Figure 9:
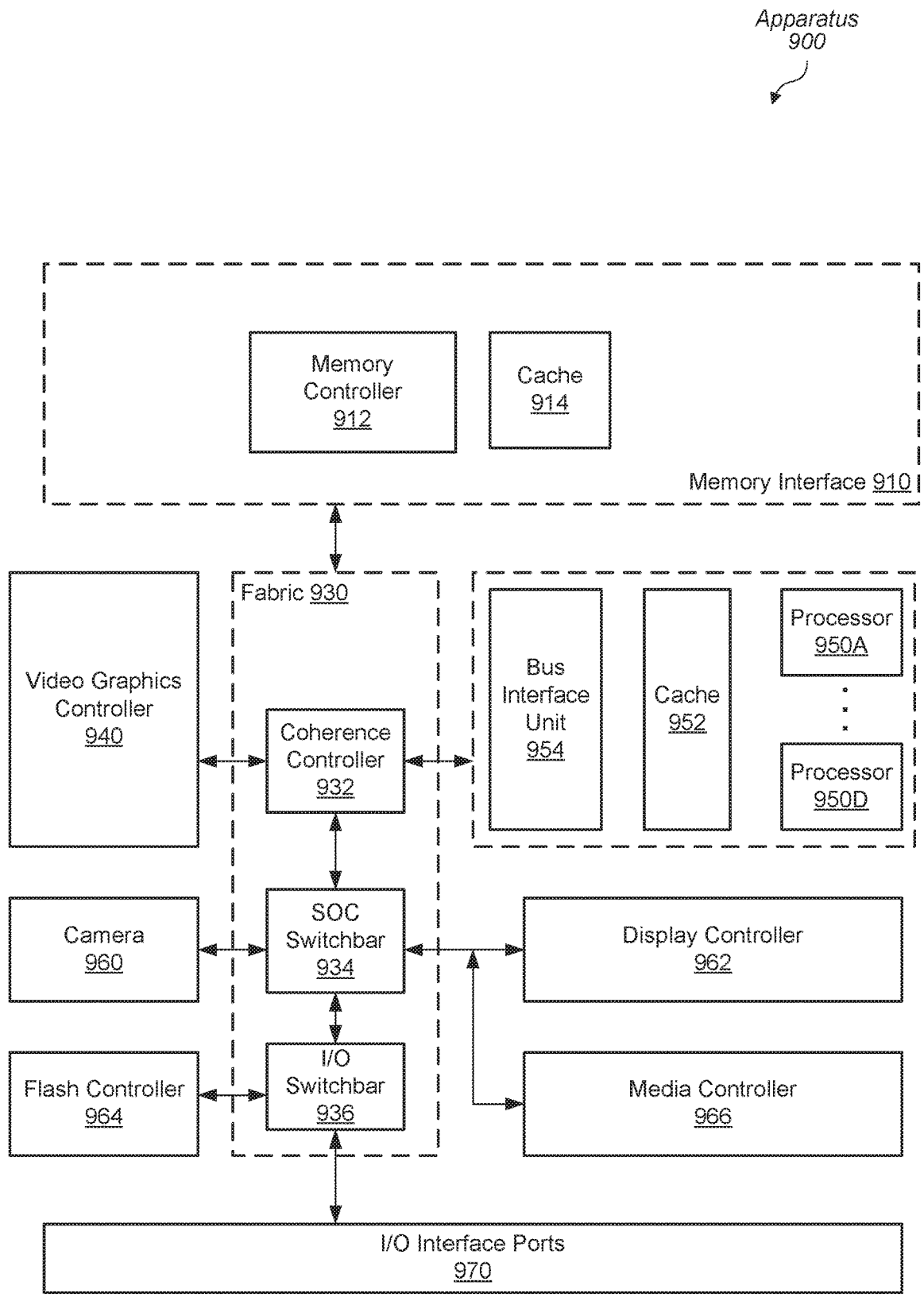
FIG. 9 is a block diagram of one embodiment of an apparatus.

Referring to FIG. 9, a generalized block diagram illustrating one embodiment of an apparatus 900 is shown. The apparatus 900 includes multiple functional blocks or units. In some embodiments, the multiple functional units are individual dies on an integrated circuit (IC), such as a system-on-a-chip (SoC). In other embodiments, the multiple functional units are individual dies within a package, such as a multi-chip module (MCM). In yet other embodiments, the multiple functional units are individual dies or chips on a printed circuit board. The multiple functional blocks or units may each be capable of accessing a shared memory.

In various embodiments, the apparatus 900 is a SOC that includes multiple types of IC designs on a single semiconductor die, wherein each IC design provides a separate functionality. The IC designs on the apparatus 900 may also be referred to as functional blocks on the apparatus 900. Traditionally, each one of the types of IC designs, or functional blocks, has been manufactured on a separate silicon wafer. In the illustrated embodiment, the apparatus 900 includes multiple IC designs; a fabric 930 for high-level interconnects and chip communication, a memory interface 910, and various input/output (I/O) interfaces 970. Clock sources, such as phase lock loops (PLLs), and a centralized control block for at least power management are not shown for ease of illustration.

The multiple IC designs within the apparatus 900 include various analog, digital, mixed-signal and radio-frequency (RF) blocks. In the illustrated embodiment, the apparatus 900 includes one or more processors 950A-950D with a supporting cache hierarchy that includes at least cache 952. In some embodiments, the cache 952 is a shared level two (L2) cache for the processors 950A-950D. In addition, the multiple IC designs include a display controller 962, a flash memory controller 964, and a media controller 966.

Further, the multiple IC designs may include a video graphics controller 940 and one or more processing blocks associated with real-time memory performance for display and camera subsystems, such as camera 960. The camera 960 uses an image blender capability and other camera image processing capabilities as is well known in the art. In some embodiments, the apparatus 900 groups processing blocks associated with non-real-time memory performance, such as the media controller 966, for image scaling, rotating, and color space conversion, accelerated video decoding for encoded movies, audio processing and so forth. The units 960 and 966 use analog and digital encoders, decoders, and other signal processing blocks. In other embodiments, the apparatus 900 uses other types of processing blocks in addition to or in place of the blocks shown.

The I/O interface ports 970 may include interfaces well known in the art for one or more of a general-purpose I/O (GPIO), a universal serial bus (USB), a universal asynchronous receiver/transmitter (uART), a FireWire interface, an Ethernet interface, an analog-to-digital converter (ADC), a DAC, and so forth.

In various embodiments, the fabric 930 provides a top-level interconnect for the apparatus 900. For example, connections to the cache coherence controller 932 exist for various requestors within the apparatus 900. A requestor is one of the multiple IC designs on the apparatus 900. The cache coherence controller 932 provides to the multiple IC designs a consistent data value for a given data block in the shared memory, such as off-chip dynamic random access memory (DRAM). The coherence controller 932 may use a cache coherency protocol for memory accesses to and from the memory interface 910 and one or more caches in the multiple IC designs on the apparatus 900. An example of a cache coherency protocol includes the MOESI protocol with the Modified (M), Owned (O), Exclusive (E), Shared (S), and Invalid (I) states.

In some embodiments, one requestor connection to the coherence controller 932 may be provided for one or more graphics processing units (GPUs) within the video graphics controller 940, one requestor connection for the processor cores 950A-950D, and one request connection for the remainder of the multiple IC designs and the I/O interface ports 970 on the apparatus 900. The SOC switch bar 934 is used to aggregate traffic from these remaining multiple IC designs.

In various embodiments, different types of traffic flow independently through the fabric 930. The independent flow is accomplished by allowing a single physical fabric bus to include a number of overlaying virtual channels, or dedicated source and destination buffers, each carrying a different type of traffic. Each channel is independently flow controlled with no dependence between transactions in different channels. In various embodiments, the fabric 930 supports traffic carrying DSIDs.

The memory interface 910 uses the memory controller 912 and the cache 914. The cache 914 is used to reduce the demands on memory bandwidth and average power consumption. As shown, in some embodiments, the memory controller 912 is not a coherency point within the apparatus 900 as it is separate from the coherence controller 932. This separation allows the cache 914 to be inserted in the path to off-chip memory. The memory cache 914 is logically located between the coherence controller 932 and the memory controller 912. Additionally, in some embodiments, the cache 914 does not participate in a cache coherency protocol. In other embodiments, the memory interface 910 uses a directory-based coherency protocol causing the coherency point to be located within the memory interface 910. In such embodiments, the cache 914 participates in the cache coherency protocol.

The cache 914 is used by each one of the multiple IC designs on the apparatus 900. In an embodiment, the allocation policy for the cache 914 is programmable. The interface between the combination of the memory interface 910 and the coherency controller 932 and the remainder of the apparatus 900, which includes the multiple IC designs and the switch bars 934 and 936, includes multiple buses. Asynchronous memory requests, responses, snoops, snoop responses, and input/output (I/O) transactions are visible at this interface with temporal relationships.

The display controller 962 sends graphics output information that was rendered to one or more display devices. The rendering of the information is performed by the display controller 962, by the video graphics controller 940, or by one of the processors 950A-950D which is a GPU. Alternatively, the display controller 969 may send graphics output information to the video graphics controller 940 to be output to one or more display devices. The graphics output information corresponds to frame buffers accessed via a memory mapping to the memory space of a GPU within the video graphics controller 940 or within one of the processors 950A-950D. The memory mappings are stored and updated in address translators. Video data read from the frame buffers stored in the off-die DRAM or the on-die cache 914 includes at least color values for each pixel on the screen.

Each one of the processors 950A-950D uses one or more cores and one or more levels of a cache memory subsystem. Each core supports the out-of-order execution of one or more threads of a software process and include a multi-stage pipeline. One or more of the processors 950A-950D uses circuitry for executing instructions according to a predefined general-purpose instruction set. For example, the PowerPC® instruction set architecture (ISA) may be selected. Alternatively, the ARM®, x86®, x86-64®, Alpha®, MIPS®, PA-RISC®, SPARC® or any other instruction set architecture is selected.

Other processor cores of processors 950A-950D have a micro-architecture which provides high instruction throughput for a computational intensive task such as a single instruction multiple data (SIMD) core. Examples of SIMD cores include graphics processing units (GPUs), digital signal processing (DSP) cores, or other. One or more of the processors 950A-950D uses multiple on-die levels (L1, L2, L3 and so forth) of caches for accessing data and instructions. If a requested block is not found in the on-die caches or in the off-die cache 952, then a read request for the missing block is generated and transmitted to the memory interface 910 or to on-die flash memory (not shown) controlled by the flash controller 964. The bus interface unit (BIU) 954 provides memory access requests and responses for at least the processors 950A-950D.

The processors 950A-950D share the on-chip flash memory and the off-chip DRAM accessed through the memory interface 910 with other processing blocks, such as graphics processing units (GPUs), application specific integrated circuits (ASICs), and other types of processor cores. Therefore, typical SOC designs utilize acceleration engines, or accelerators, to efficiently coordinate memory accesses and support coherency transactions between processing blocks and peripherals. In a SOC design that includes multiple processors and processing blocks, these components communicate with each other to control access to shared resources.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist comprising a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
    a processor;
    a memory cache coupled to a lower-level memory;
    a memory cache controller;
    wherein the processor is configured to:
        calculate a first set of quotas for a plurality of quota groups, wherein one or more data flows map to one or more quota groups of the plurality of quota groups, wherein a quota represents an amount of space in the memory cache;
        cause the memory cache controller to enforce memory cache usage of the one or more data flows according to a corresponding quota, from the first set of quotas, allocated for the plurality of quota groups;
        monitor the memory cache usage and status of the one or more data flows during run-time;
        based at least in part on a determination that a change has occurred in at least one of the memory cache usage or status of the one or more data flows, calculate a second set of quotas for the plurality of quota groups based on an estimated change in bandwidth that would result from a change in a quota, wherein the second set of quotas changes at least one quota of the first set of quotas from a first non-zero amount to a second non-zero amount; and cause the memory cache controller to enforce the memory cache usage of the one or more data flows according to a corresponding quota, from the second set of quotas, allocated for the plurality of quota groups.

2. The system as recited in claim 1, wherein based at least in part on a determination that a priority of a given memory request is greater than a lowest priority of given cache ways within a same quota group of the plurality of quota groups, the processor is further configured to replace a least recently used (LRU) cache way of the given cache ways within the same quota group.

3. The system as recited in claim 1, wherein based at least in part on a determination that a priority of a given memory request is lower than a lowest priority of given cache ways within a same quota group of the plurality of quota groups, the processor is further configured to forgo allocating data of the given memory request in the memory cache.

4. The system as recited in claim 1, wherein the processor to is further configured to:
assign a first quota to a first quota group with a first bandwidth reduction score; and
assign a second quota to a second quota group with a second bandwidth reduction score that is lower than the first bandwidth reduction score.

5. The system as recited in claim 1, wherein the processor is further configured to assign a priority to one or more data flows which is based on a bandwidth reduction score calculated for the data flow.

6. The system as recited in claim 5, wherein the processor is further configured to convey, to the memory cache controller, indications of assigned priorities of the plurality of quota groups.

7. The system as recited in claim 1, wherein the processor is further configured to over-allocate the memory cache, wherein a total size of the second set of quotas defining a plurality of portions of the memory cache is greater than a capacity of the memory cache.

8. An apparatus comprising:
a memory storing program instructions; and
a processor coupled to the memory, wherein the program instructions are executable by the processor to:
calculate a first set of quotas for a plurality of quota groups, wherein:
one or more data flows map to one or more quota groups of the plurality of quota groups, wherein a quota represents an amount of space in the memory cache;
cause a memory cache controller to enforce memory cache usage of the one or more data flows according to a corresponding quota, from the first set of quotas, allocated for the plurality of quota groups;
receive updates regarding the memory cache usage and status of one or more data flows during run-time;
based at least in part on a determination that a change has occurred in at least one of the memory cache usage or status of the one or more data flows, calculate a second set of quotas for the plurality of quota groups based on an estimated change in bandwidth that would result from a change in a quota, wherein the second set of quotas changes at least one quota of the first set of quotas from a first non-zero amount to a second non-zero amount; and
cause the memory cache controller to enforce the memory cache usage of the one or more data flows according to a corresponding quota, from the second set of quotas, allocated for the plurality of quota groups.

9. The apparatus as recited in claim 8, wherein based at least in part on a determination that a priority of a given memory request is greater than a lowest priority of given cache ways within a same quota group of the plurality of quota groups, the program instructions are further executable by the processor to replace a least recently used (LRU) cache way of the given cache ways within the same quota group.

10. The apparatus as recited in claim 8, wherein based at least in part on a determination that a priority of a given memory request is lower than a lowest priority of given cache ways within a same quota group of the plurality of quota groups, the program instructions are further executable by the processor to forgo allocating data of the given memory request in the memory cache.

11. The apparatus as recited in claim 8, wherein the program instructions are further executable by the processor to:
assign a first quota to a first quota group with a first bandwidth reduction score; and
assign a second quota to a second quota group with a second bandwidth reduction score that is lower than the first bandwidth reduction score.

12. The apparatus as recited in claim 8, wherein the program instructions are further executable by the processor to assign a priority to one or more data flows which is based on a bandwidth reduction score calculated for the data flow.

13. The apparatus as recited in claim 12, wherein the program instructions are further executable by the processor to convey, to the memory cache controller, indications of assigned priorities of the plurality of quota groups.

14. The apparatus as recited in claim 8, wherein the program instructions are further executable by the processor to over-allocate a memory cache, wherein a total size of the second set of quotas defining a plurality of portions of the memory cache is greater than a capacity of the memory cache.

15. A method comprising:
calculating a first set of quotas for a plurality of quota groups, wherein:
one or more data flows map to one or more quota groups of the plurality of quota groups, wherein a quota represents an amount of space in the memory cache;
causing a memory cache controller to enforce memory cache usage of the one or more data flows according to a corresponding quota, from the first set of quotas, allocated for the plurality of quota groups;
monitoring the memory cache usage and status of one or more data flows during run-time;
in response to determining that a change has occurred in at least one of the memory cache usage or status of the one or more data flows, calculating a second set of quotas for the plurality of quota groups based on an estimated change in bandwidth that would result from a change in a quota, wherein the second set of quotas changes at least one quota of the first set of quotas from a first non-zero amount to a second non-zero amount; and
causing a memory cache controller to enforce the memory cache usage of the one or more data flows according to a corresponding quota, from the second set of quotas, allocated for the plurality of quota groups.

16. The method as recited in claim 15, wherein in response to determining that a priority of a given memory request is greater than a lowest priority of given cache ways within a same quota group of the plurality of quota groups, the method further comprises replacing a least recently used (LRU) cache way of the given cache ways within the same quota group.

17. The method as recited in claim 15, wherein, in response to determining a priority of a given memory request is lower than a lowest priority of given cache ways within a same quota group of the plurality of quota groups, the method further comprises forgoing allocation of data of the given memory request in the memory cache.

18. The method as recited in claim 15, further comprising:
assigning a first quota to a first quota group with a first bandwidth reduction score; and
assigning a second quota to a second quota group with a second bandwidth reduction score that is lower than the first bandwidth reduction score.

19. The method as recited in claim 15, further comprising assigning a priority to one or more data flows which is based on a bandwidth reduction score calculated for the data flow.

20. The method as recited in claim 19, further comprising conveying, to the memory cache controller, indications of assigned priorities of the plurality of quota groups.

* * * * *